(12) United States Patent
Heiter-Kelly

(10) Patent No.: US 9,092,993 B2
(45) Date of Patent: Jul. 28, 2015

(54) HARMONIOUS SCALE INSTRUMENT

(76) Inventor: Carla Rose Heiter-Kelly, Delaware (CA)

( * ) Notice: Subject to any disclaimer, the term of this patent is extended or adjusted under 35 U.S.C. 154(b) by 44 days.

(21) Appl. No.: 12/885,863

(22) Filed: Sep. 20, 2010

(65) Prior Publication Data

US 2012/0067191 A1    Mar. 22, 2012

(51) Int. Cl.
| | |
|---|---|
| G09B 15/06 | (2006.01) |
| G09B 15/02 | (2006.01) |
| G10D 1/00 | (2006.01) |
| G10G 1/00 | (2006.01) |

(52) U.S. Cl.
CPC ............... *G09B 15/02* (2013.01); *G09B 15/06* (2013.01); *G10D 1/00* (2013.01); *G10G 1/00* (2013.01)

(58) Field of Classification Search
CPC ........ G09B 15/00; G09B 15/003; G10G 1/02; G10G 5/005; G01B 5/20
USPC .................................................... 84/267, 293
See application file for complete search history.

(56) References Cited

U.S. PATENT DOCUMENTS

| | | | | |
|---|---|---|---|---|
| 3,590,131 | A | * | 6/1971 | Reyers ............................. 84/675 |
| 5,175,387 | A | * | 12/1992 | Greory ............................. 84/267 |
| 2004/0187673 | A1 | * | 9/2004 | Stevenson ........................ 84/737 |

OTHER PUBLICATIONS

Grout, Donald Jay, "History of Western Music, 3rd Edition", W W Norton & Co. Inc. Sep. 1996. pp. 2-11.

I. Samuel XVI: 14-23. The Bible.
Joshua VI: 12-20. The Bible.
Horowitz, Leonard G. and Puleo, Joseph, "Healing Codes for the Biological Apocalypse", Healthy World Distributin, May 1999. pp. 35-197, 348-353.

* cited by examiner

*Primary Examiner* — Kimberly Lockett
(74) *Attorney, Agent, or Firm* — Eduardo Krupnik; Miller Thomson LLP

(57) ABSTRACT

There is provided a musical instrument for producing a harmonious scale of musical notes, said instrument having nine separate sound actuators each of which is configured to cause the musical instrument to generate a different musical tone selected from the group of frequencies comprising 174 hz, 285 hz, 396 hz, 417 hz, 528 hz, 639 hz, 741 hz, 852 hz and 963 hz, the musical instrument being configured such that physically manipulating the sound actuators causes the musical instrument to generate the musical tone corresponding to the sound actuator manipulated. The invention is also directed at a system for writing music to be played with a musical instrument incorporating the harmonious scale of musical notes as described above. The notation system consists a staff of five equally spaced parallel and horizontal lines separated by four spaces, the first line indicating a fist note of 174 hz, the space immediately above the first line indicating a second note of 285 hz, the second line indicating a third note of 396 hz, the space immediately above the second line indicating a fourth note of 417 hz, the third line indicating a fifth note of 528 hz, the space immediately above the third line indicating a sixth note of 639 hz, the fourth line indicating a seventh note of 741 hz, the space immediately above the fourth line indicating an eighth of 852 hz and the fifth line, indicating a ninth note of 963 hz.

11 Claims, 3 Drawing Sheets

Diatonic Scale

| Letter | Note | Frequency HZ |
|--------|------|--------------|
| C | Do | 264 |
| D | Re | 297 |
| E | Mi | 330 |
| F | Fa | 352 |
| G | Sol | 396 |
| A | La | 440 |
| B | Si | 495 |
| C' | do | 528 |

Fig. 4

HARMONIOUS SCALE INSTRUMENT

FIELD OF THE INVENTION

The invention relates generally to instruments for generating musical notes.

BACKGROUND OF THE INVENTION

When we look back to the earliest records of music, and its purpose, it was an inseparable part of religious ceremonies. Plato and Pythagoras taught the world to understand that the whole spiritual and physical universe was the understanding of numbers. So the system of music, sounds, and rhythms, being ordered by numbers, were conceived as exemplifying the harmony of the cosmos and corresponding to it. The most important aspects of Greek thoughts on music is "that there is a power in music akin to the power of words for influencing human thought and action and that therefore an artist, whether in music or words, is under obligation, to exercise use of this power with due respect for its effect on others. Music or vibration could heal sickness, purify the body and mind and work miracles in the realm of nature." {History of Western Music, 3rd ed. Donald Jay Grout, pg 2-11). Similar powers are attributed to music in the Old Testament: David cures Saul's madness by playing the harp (I. Samuel XVI: 14-23) or of the trumpet blasts and shouting that toppled the walls of Jericho (Joshua VI: 12-20).

The great composers of the Baroque, Classical and Romantic eras tuned their instruments through their own genius ear in what resonated with, nature. In 1919 it was decided to standardize the tuning system of Western music so that all instruments could play together. This 12 tone Equal Temperament System based on man-made standards in which A was equal to 440 Hz has continued to the present time.

The Harmonious System involves creating a new category of musical instruments or devices tuned with the new Harmonious Scale. If our present diatonic scale is not in harmony with mankind or nature, then it is imperative that we create a system that is. Dissonant and unharmonious vibrations or sounds create anxiety, tension, health, problems, mental, disorders, emotional disorders, and a feeling of disconnectedness to the universe. Harmonious vibrations create feelings of peace, love, harmony, health and wellness amongst humans, animals and nature. It is in the world's best interest to have a category of Harmonious Instruments equipped with the Harmonious Scale Tuning System.

The Harmonious Scale is an ATONAL system, consisting of 9 frequencies. Atonal means a manner of organizing tones so that no one of them has greater importance than the others. The present diatonic system of Western music is tonal in which specific notes such as the tonic, dominant and leading notes have more importance than the other notes. However, the dominant-seventh chord is the most "unstable" chord in music writing and demands resolution to the tonic. The Harmonious Scale being atonal removes the tension that is normally built up while we await the return of the tonic which can sometimes feel like safety. The Harmonious Scale has no tonic, and there are no major or minor keys or modulations to other keys, and no key signatures, no sharps, flats or accidentals. It is a simple system of 9 precise frequencies in which you can start or end on any note without adhering to complex composition rules. Only certain intervals or chord combinations within the diatonic system sound pleasing. All intervals and combinations of notes in the Harmonious Scale are pleasing to the ear, or all in harmony with each of the other tones produced. This makes music composition very easy and opens up a whole new field of "creative" and "intuitive" playing for persons who find the Western music study too difficult. A musical performer often "becomes one" or is in the "zone" with their instrument and without worry of adhering to complicated composition rules, improvising, performing and Sound Healing become so much easier. Therefore, music expression and creativity have no boundaries within the scope of people, their age, intellectual ability, race, culture and language, or nations dividing us. People from around the world, young and old, of simple or highly evolved abilities, can understand, perform, compose, improvise together in a universal simple Harmonious System where "all is one" and there is no wrong way to play. Because of its simplicity, it also allows mastery of this Harmonious System very quickly and at a younger age.

The Harmonious Scale System is based on Pythagoras and Plato's ancient Greek "MODAL" system. They taught that all sounds have an "affect" on everything around us, so basically "You are what you listen, to". For example: listening to dance rhythms would have the modal affect of inspiring others to dance. Another example would be to take the time signature out of the creative musical experience. The modal effect here is one of freedom of expansion of intuition, and consciousness, because all structure and sense of time is eliminated.

Modern medicine presently uses frequency devices and technology with many, many frequencies, and complicated procedures for healing and diagnostic purposes. Research into this complete system of 9 healing frequencies could not only simplify, and enhance their technology; the recovery or prevention of disease could change profoundly. For the general populations around the world, to hear more harmonious sounds will be beneficial, on all levels of our being. This harmonious system opens up a new category of study of music for the "seasoned" musicians, and allows people who wouldn't play musical instruments to have this other option, a less complicated study with a focus on creating and healing (and not on performance).

Music has always been a reflection, of the culture that gave rise to it and a reflection of what was going on in the world, politically, socially, and philosophically. Playing atonal, modal music, all tones in harmony with each other and nature would reflect and enhance greatly the move of the world towards unity, less division among races, nations and peace and harmony among all, as well as living intentionally, knowing that we are all affected and affect each other by the sounds around us. Therefore, an improved harmonious musical device would be beneficial.

SUMMARY OF THE INVENTION

In accordance with one aspect of the present invention, there is provided a musical instrument (either electronic or acoustical) for producing a harmonious scale of musical notes, said instrument having nine separate sound actuators each of which is configured to cause the musical instrument to generate a different musical tone selected from the group of frequencies comprising 174 hz, 285 hz, 396 hz, 417 hz, 528 hz, 639 hz, 741 hz, 852 hz and 963 hz, the musical instrument being configured such that physically manipulating the sound actuators causes the musical instrument to generate the musical tone corresponding to the sound actuator manipulated. This Harmonious scale and tuning system will also work equally as well in either acoustic or electronic devices for healing, or in creating music.

In accordance with another aspect of the present invention, there is provided a musical instrument for producing a harmonious scale of musical notes, the musical instrument consisting of nine strings coupled to a resonator. Each of the strings is mounted to the musical instrument such that each of the strings can vibrate at a specific frequency when manipulated by a user, the first string being configured to vibrate at a frequency of 963 hz, the second string being configured to vibrate at 852 hz, the third string being configured to vibrate at 741 hz, the fourth string being configured to vibrate at 639 hz, the fifth string being configured to vibrate at 528 hz, the sixth string being configured to vibrate at 417 hz, the seventh string being configured to vibrate at 396 hz, the eighth string being configured to vibrate at 285 hz and the ninth string being configured to vibrate at 174 hz.

In accordance with another aspect of the present invention, there is provided a musical instrument for producing a harmonious scale of musical notes, said musical instrument consisting of nine strings of different lengths coupled to a resonator. The ninth, eighth, and seventh strings each having a gauge of 0.02, the sixth, fifth and fourth strings each having a gauge of 0.018, the third string having a gauge of 0.015, the second string having a gauge of 0.014 and the first string having a gauge of 0.012, the strings each being tensioned such that the first string vibrates at 963 hz, the second string vibrates at 852 hz, the third string vibrates at 741 hz, the fourth string vibrates at 639 hz, the fifth string vibrates at 528 hz, the sixth string vibrates at 417 hz, the seventh string vibrates at 396 hz, the eighth string vibrates at 285 hz and the ninth string vibrates at 174 hz.

In accordance with yet another aspect of the present invention, there is provided a notation system for writing music consisting of a series of different harmonious notes. The notation system consists of marking the different notes to be played on a staff of five equally spaced parallel and horizontal lines separated by four spaces, the first line being the lowermost line indicating a first note with a frequency of 174 hz, the space immediately above the first line indicating a second note with a frequency of 285 hz, the second line indicating a third note with a frequency of 396 hz, the space immediately above the second line indicating a fourth note with a frequency of 417 hz, the third line indicating a fifth note with a frequency of 528 hz, the space immediately above the third line indicating a sixth note with a frequency of 639 hz, the fourth line indicating a seventh note with a frequency of 741 hz, the space immediately above the fourth line indicating an eighth note with a frequency of 852 hz and the fifth line, being the topmost line, indicating a ninth note with a frequency of 963 hz.

In accordance with yet another aspect of the present invention, there is provided a method of treating a person using the musical instrument as described above, the method including the steps of playing a series of the musical notes while the person listens to the series of musical notes.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 4 is a schematic view of the diatonic scale.

In the drawings like characters of reference indicate corresponding parts in the different figures.

DETAILED DESCRIPTION OF THE INVENTION

Figure 1:
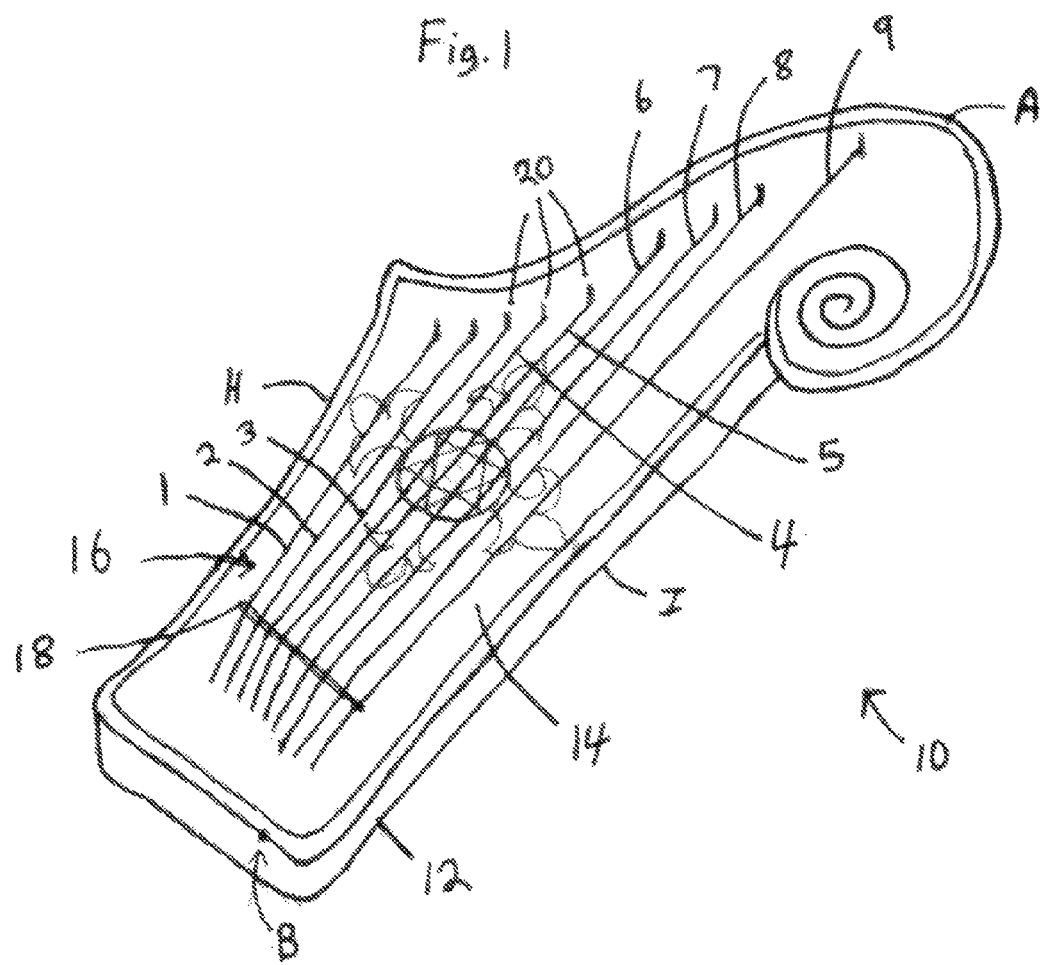
FIG. 1 is a perspective view of a musical instrument made in accordance with the present invention.

The harmonious scale is a system of 9 frequencies, all in harmony with, each other and nature, to be utilized, as a new system of tuning and scale system for a new category of musical instruments that will have major implications for personal and world healing. These nine frequencies are 174 hz, 285 hz, 396 hz, 417 hz, 528 hz, 639 hz, 741 hz, 852 hz and 963 hz. The nine frequencies are a mathematical set of vibrations that are so complete, that if one was to try to continue the sequence, the whole set just repeats itself. Therefore, in its entirety, we need only a scale of 9 frequencies or notes in a musical instrument or device for healing. Notice the numbers vertically in each column. It is a complete set of numbers 1 thru 9. If we wanted to continue this mathematical sequence, the number following 963 would be 174 and the sequence would repeat itself over and over again.

Six of these original sound frequencies were apparently used in the great hymn to St. John the Baptist that along with many Gregorian chants, were lost centuries ago according to church officials. The chants and their special tones were believed to impart special spiritual blessings when sung in harmony. The church found people becoming too spiritually empowered when singing these chants in perfect 5ths, so law was formulated enforcing only a single line of melody could be sung and no one was allowed to sing in harmony. Anyone disobeying this new law, was killed, and these Sacred musical tools for divination and ascension purposes were hidden until today.

More recently, the missing 3 frequencies were re-discovered by Dr. Joseph Puleo from Idaho assisted by Dr. Leonard Harowitz, Harvard trained award winning investigator. Their research on what they call "The Original Solfeggio Scale" is documented in the book 'Healing Codes for the Biological Apocalypse". There has been great interest in reusing these 9 frequencies, in hopes of retuning our world into a more harmonious, peaceful place, and reinstating the sacred component back into our music.

To utilize this Harmonious Scale, a new category of instruments would need to be made called Harmonious instruments with the Harmonious Tuning System, on either acoustic or electric instruments. This would include 9 notes or frequencies on any one of the instruments. There is not much use for any more notes, as they would just be repeating the same frequencies as it already contained in the 9 frequencies. Most instruments available in the world today are set up with the diatonic scale, with the 12 tone Equal Temperament Tuning System. Retrofitting today's piano to this 9 frequency based scale would not work easily. For example, a new instrument, the Harmonious piano or keyboard could be designed with the Harmonious Scale, with 9 keys only. It would look very different because it would have only white keys, and only 9 frequencies. Likewise, woodwind instruments such as the flute, piccolo, clarinet, oboe, etc, could redesign the tuning system to the Harmonious Scale and have a whole new category of instruments. New designs of all existing instruments could be considered in this Harmonious Tuning System.

Referring now to FIG. 1, the Sacred Harp is the first instrument invented with the Harmonious Scale and tuning system and is shown generally as item 10. The instrument comprises a body portion 12, preferably made of a hard wood such as cherry, for good resonance. The resonator or sound box, 14, is formed in the body and is hollow to maximize the sound generated by strings 16 mounted adjacent thereto. Strings 16 are essentially similar to standard guitar strings. Each of the strings is of different length. The Harp shows the dimensions from point A to point B is 68 cm. and is 16.25 cm from point H to point I. There is a 9 cm, sound hole on the front hand-carved with any suitable decorative feature such as the Star of David, or 2 triangles overlapped, one pointing up, the other pointing down. The strings feed in through the back of the instrument each a separate entry. They are held by a traditional knot inside the sound box and thread through the front of the sound box 14, each through their corresponding holes where the string is pulled tight across a wooden bridge 18 and then across the length of the sound box and secured to tuning pins 20.

The nine strings are each configured to vibrate at a different harmonious frequency. The frequency generated by each string is a function of the strings length, gauge and the tension applied to the string. Strings 1 through 9 get progressively longer, and their thicknesses (gauge) as well as the tension applied to them are selected so that together, the strings produce all of the notes (frequencies) of the harmonious scale. The highest tone (frequency) is generated by the shortest string, string 1. String 1 preferably has a gauge of 0.012 and is tensioned sufficiently to generate a frequency of 963 hz when plucked or strummed. String 2 is preferably longer and is thicker having a gauge of 0.014. String 2 is tensioned to vibrate at a frequency of 852 Hz. String 3 preferably has a gauge of 0.015 and is tensioned to vibrate at 741 Hz. String 4 has a gauge of 0.018 and is tensioned to vibrate at 639 Hz. String 5 has a gauge of 0.018 and is tensioned to vibrate at 528 Hz. String 6 has a gauge of 0.018 and is tensioned to vibrate at 417 Hz. String 7 has a gauge of 0.020 and is tensioned to vibrate at 396 Hz. String 8 has a gauge of 0.020 and is tensioned to vibrate at 285 Hz. Finally, string 9 is the longest string and preferably has a gauge of 0.20 and is tensioned sufficiently to vibrate at 174 Hz.

Harp 10 is an acoustic instrument which can be plucked or strummed. It is held with the base (G) of the Sacred Harp in one's lap if sitting or in one's arms if standing and held upright and slanted slightly to the left with the sound hole facing away from the performer. Strings 1 through 9 act as sound actuators which, when physically manipulated by a user, such as by plucking or strumming, cause the harp to generate the musical tones associated with the strings. The strings, each being coupled to the resonator (sound box) transfers it's vibrations to the resonator, which permits the musical instrument to generate audible musical tones even when the strings are manipulated gently. It has been discovered that the calming and healing properties of the harmonious scale is particularly effective when the instrument tuned to it takes the form of a harp, as the musical properties of music emanating from a harp are generally more relaxing and more calming than other instruments. The harp is therefore well suited to the harmonious scale and in particular for use in sound/music therapy. It will be appreciated that the harmonious scale can be incorporated into other stringed instruments such as wood winds, horns or even electronic instruments. Of course, instruments such as pianos, harpsichords, and electronic instruments would use keys in place of strings. Likewise, wood winds and horns would use holes or valves as sound actuators which, when depressed (or covered) would cause the instrument to generate notes from the harmonious scale.

The Harmonious Scale is ATONAL, meaning all frequencies are equal in importance, and there is no tonal center. All 9 frequencies are harmonious with each of the other frequencies. Therefore, using an instrument made in accordance with this invention, a composer, performer, Sound Healer or anyone else using an instrument or device designed with this set of 9 frequencies can begin, and end on any one of the 9 notes without a key signature, or a set of rules defining appropriate composition, harmonious intervals or chords as all will sound good together, one note at a time, or several and the combinations have no limits. For the first time, improvisation is totally free, and there is no wrong way to perform.

Healing by Sound Frequencies is based on RESONANT ENTRAINMENT OF OSCILLATING SYSTEMS. This is a well-understood principle within the physical sciences and Sound Healing. For example, if a tuning fork designed to produce a frequency of 440 Hz is struck {causing it to oscillate} and then brought into the vicinity of another 440 Hz tuning fork, the second tuning fork will begin, to oscillate. The first tuning fork is said to have entrained, the second or caused it to resonate. Any tuning forks of a different frequency will not be affected, there is no resonance. This is considered "free resonance". "Forced resonance" occurs when one vibrating source produces vibrations in another object even though those two objects may not share the exact same frequency. The vibrations of one can ENTRAIN or change those of the other. Those vibrating sources that are subject to the influence of "forced resonance" will resonate with many different frequencies. The physics of entrainment apply to bio-systems as well. The human body also resonates in this manner, responding to all the frequencies around it.

In Sound Healing, by the use of the Sacred Harp, or another instrument or device which is made in accordance with the present invention, the concept of resonant frequency healing applies, in which the natural, vibrations are restored. Through restoring the body's own resonant frequencies, and balancing its energy systems, the body will begin to heal itself. Very simply put, if a part of the body vibrates "out of harmony", a trained Sound Healer can by use of the correct resonant frequency, entrain that part of the physical, emotional, mental, or spiritual bodies within a person's whole etheric and physical body back into "harmony" allowing for the natural healing process innate within the body to take place.

In Sound Healing, sonic "entrainment" occurs in which the brain waves of the listener lock into resonance with the frequencies sounded by the Sound Healer for the time of the treatment. The healing sound frequencies often have a "slowing down" effect on the recipient's brain waves that puts us in resonance with frequencies that are in the alpha or theta brain wave range, 7 to 12 Hz, and 4 to 7 Hz, respectively. Many of the environmental sounds seem to resonate to this spectrum of sound and particularly to a frequency called the Schumann resonance, 783 Hz, which is thought to be the resonant frequency of the planet. Environmental sounds, such as birds chirping, rain, or the sound of waves, etc. may be among the most soothing on the planet, and are often used by therapists, such as for massage, reiki, cranial sacral etc. With sonic entrainment, our hearts start to beat with the heats of the earth, arid we are "in harmony" with the universe. It is well known that the sounds of traffic, sirens, and other busy city sounds affect us as well but in a more negative way. We can't avoid big cities and the noise, but we could drive along listening to music produced with the Harmonious Scale to help keep our energy systems balanced rather than, the music that is produced with the present diatonic scale and 12 tone equal temperament system which has been proven to be out of harmony with nature and with the human body.

Harmonious Music Notation

Figure 2:
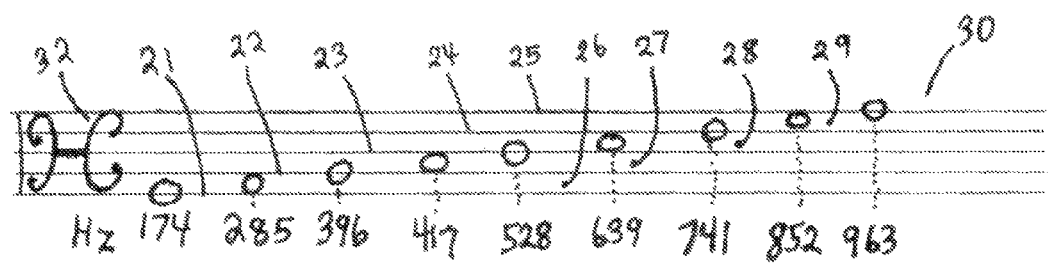
FIG. 2 is a schematic view of a notation system for writing music on an instrument tuned to the harmonious scale.

Implementing the Harmonious Scale in written music can be done in the following method, as illustrated in FIG. 2. Using today's manuscript paper, the Harmonious Scale, the system of 9 frequencies can easily fit on a staff 30 of five lines (lines 21, 22, 23, 24 and 25) and four spaces (26, 27, 28 and 29) using every line and space. It fits perfectly. The pitch is shown by placement of notes on the staff and duration is shown with different note values and additional symbols such as dots and ties, basically utilizing the same notes that are already used in the study of music, such as quarter notes, half notes) whole notes etc. and their corresponding rests.

The lines and spaces in staff 30 indicate the frequencies the placed notes have. Line 21 (the lowermost line) indicates a first note with a frequency of 174 Hz. Space 26 immediately above the first line indicates a second note with a frequency of 285 Hz. Second line 22 indicates a third note with a frequency of 396 Hz. Space 27 immediately above the second line indicates a fourth note with a frequency of 417 Hz. Third line 23 indicates a fifth note with a frequency of 528 Hz. Space 28 immediately above the third line indicates a sixth note with a frequency of 639 Hz. Fourth line 24 indicates a seventh note with a frequency of 741 Hz. Space 29 immediately above the fourth line indicates an eighth note with a frequency of 852 Hz. Fifth line 25, being the topmost line, indicates the highest ninth note with a frequency of 963 Hz.

A staff of written music generally begins with a clef and the Harmonious Clef 32 is demonstrated in FIG. 2 utilizing an H with the 528 Hz line crossed with the middle of the H. Following the clef will be a time signature or not depending on the nature of the piece. In the case of a time signature, measures or bar lines will divide the piece into regular groupings of beats, according to the time signatures specification. A piece may change time signatures during the piece by indicating a new time signature, and any bars following, would be in the new time. Directions to the player regarding matters such as tempo and dynamics or MODE are added above or below the staff. For vocal music, lyrics are written in with the words or sounds under the corresponding notes.

Figure 3:
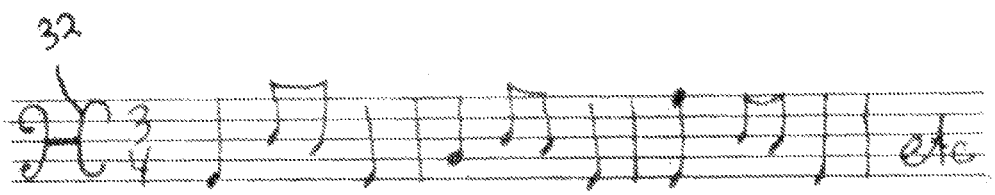
FIG. 3 is a schematic view of a short piece of music written using the notation system illustrated in FIG. 2.

FIG. 3 illustrates how rhythms and time signatures are to be used; single notes are shown in bar 1, clusters in bar 2 and strumming of all the notes is indicated in bar 3. Notation for ensembles and orchestras is a score showing music for all players together, while parts contain only the music played by an individual musician.

Using the Harmonious Scale System in Music Education and Sound Healing

The following is a guideline for teaching others to use instruments or devices with the Harmonious Scale and Tuning System.

1. Align yourself with your heart, come into a space of love, state a prayer of intention: Decide as an individual or as a group, the purpose behind the sound, what is it you are trying to create or heal. This intention is very important as the energy, or your purpose is transmitted through the sound, Use positive words and affirm your words in the present tense, For example: "We live in peace"; "we live in joy"; "we live in harmony and love"; "I am healed on all levels"; "you are totally balanced and in good health"; "the waters of the earth are clean and pure, a perfect ecosystem", etc. With the use of your 5 senses, and emotions, visualize, taste, smell, hear and feel what this intention looks like, feels like, tastes and smells and sounds like, affirming that it is done.

If it is your custom to ask for higher guidance and assistance in fulfilling this intention, the philosophy of this practice recognizes "ALL IS ONE", therefore there is no dogma and it is not a religion. Everyone around the world, regardless of religious affiliation or faith can join together for a common purpose.

2. Align yourself totally and become "one" with the instrument 'Whether an individual, instrumentalist or orchestra is reading music or improvising, it does not matter. Each musician will learn to get in the "zone" or become "one" with the instrument, allowing the music to flow through them, allowing the breath to be the vehicle through which the sound moves. This is a meditative state in which higher levels of intuition and higher guidance can be accessed.

3. Offer gratitude that your intention is fulfilled.

As with anything in life, the more energy we put into our projects, and the more people working on the same goal, the closer we come to fulfilling each dream, and all is possible. Sound Healers arid other Energy Medicine Practitioners know that one session can produce the results in some instances; some others take 2 or 3 or maybe 10 or more. This methodology recognizes that the only limitations we have are those that we impose upon ourselves and others. Within school education systems, this methodology system will teach children to align, themselves with a purpose and to live intentionally. It teaches children the original powerful purpose of sound and music and how they can make a difference in the world, it reminds us all to think before we speak, before we produce the sounds and vibrations we put out into the world which will have an affect on everything else. This methodology reminds us of our true soul purpose to make a difference in the world, {hopefully for the better}, to find that power and to live and practice it. Within the medical/healing systems, this methodology will teach practitioners to align themselves completely with their job, as their intention to heal, and from a place of love must be present. It will simplify the technology used for treating illnesses and economically be more advantageous. It will heal on all levels of our BEING: BODY-MIND & SOUL rather than just body-mind. It will heal more deeply and completely, therefore reoccurrances of disease, and illnesses are less likely, and the speed of recovery will be profound, which allows people to get on with living, and practitioners free to help others. This would dramatically help our Health Care System.

The purpose of this invention is to create a new category of musical instruments or devices for healing with these 9 frequencies, The Sacred Harp is one example of an instrument constructed with the Harmonious Tuning System, and is used in Sound Healing. The methodology in using this Harmonious Tuning system enables us to teach and promote awareness of intentional use of our sounds and music, through the understanding and teaching of physics of vibration, resonance vibrations theory, and vibrational entrainment, Through this understanding of how powerful vibrations are, we can, all, make a difference affecting the health and wellness of ourselves, our families, and these vibrations go out into 'the communities and out into the world. The methodology promotes creativity, intuition, meditation, sacred sound and healing and unity among all people, regardless of age, race, religion or anything else that has in the past, kept us divided, This atonal Harmonious Scale and Tuning System is a reflection of the sounds that will unite the world in peace, joy, love and harmony.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A musical instrument for producing an atonal harmonious scale of musical notes, said instrument having a total of no more than nine separate sound actuators each of which is configured to cause the musical instrument to generate a different atonal harmonious musical frequency selected from the group of frequencies consisting of 174 hz, 285 hz, 396 hz, 417 hz, 528 hz, 639 hz, 741 hz, 852 hz and 963 hz, the musical instrument being configured such that physically manipulating the sound actuators causes the musical instrument to generate the atonal harmonious musical frequency corresponding to the sound actuator being manipulated.

2. The musical instrument according to claim 1 wherein the nine separate sound actuators each comprise a member which can be physically manipulated by a user to cause the instrument to emit the musical frequency associated with that particular sound actuator.

3. The musical instrument according to claim 2 wherein the musical instrument is a stringed instrument having nine strings, the first string being tuned to vibrate at 963 hz, the second string being tuned to vibrate at 852 hz, the third string being tuned to vibrate at 741 hz, the fourth string being tuned to vibrate at 639 hz, the fifth string being tuned to vibrate at 528 hz, the sixth string being tuned to vibrate at 417 hz, the seventh string being tuned to vibrate at 396 hz, the eighth string being tuned to vibrate at 285 hz and the ninth string being tuned to vibrate at 174 hz.

4. The musical instrument according to claim 3 wherein the musical instrument is a harp.

5. The musical, instrument according to claim 4 wherein the seventh, eighth and ninth strings have a gauge of 0.20, and wherein the fourth, fifth and sixth strings each have a gauge of 0.018, and wherein the third string has a gauge of 0.015, and wherein the second string has a gauge of 0.014 and wherein the first string has a gauge of 0.012.

6. A musical instrument for producing an atonal harmonious scale of musical notes, said musical instrument comprising nine strings coupled to a resonator, each of the strings being mounted to the musical instrument such that each of the strings can vibrate at a specific frequency when manipulated by a user, the first string being configured to vibrate at 963 hz, the second string being configured to vibrate at 852 hz, the third string being configured to vibrate at 741 hz, the fourth string being configured to vibrate at 639 hz, the fifth string being configured to vibrate at 528 hz, the sixth string being configured to vibrate at 417 hz, the seventh string being configured to vibrate at 369 hz, the eighth string being configured to vibrate at 285 hz and the ninth string being configured to vibrate at 174 hz.

7. The musical instrument of claim 6 wherein the ninth, eighth, and seventh strings each have a gauge of 0.02, and wherein the sixth, fifth and fourth strings each have a gauge of 0.018, and wherein the third string has a gauge of 0.015, and wherein the second string has a gauge of 0.014 and wherein the first string has a gauge of 0.012.

8. A musical, instrument for producing an atonal harmonious scale of musical notes, said musical instrument comprising nine strings of different lengths coupled to a resonator, the ninth, eighth, and seventh strings each having a gauge of 0.02, the sixth, fifth and fourth strings each having a gauge of 0.018, the third string having a gauge of 0.015, the second string having a gauge of 0.014 and the first string having a gauge of 0.012, the strings each being tensioned such that the first string vibrates at 963 hz, the second string vibrates at 852 hz, the third string vibrates at 741 hz, the fourth string vibrates at 639 Iv, the fifth string vibrates at 528 hz, the sixth string vibrates at 417 hz, the seventh string vibrates at 396 hz, the eighth string vibrates at 285 hz and the ninth string vibrates at 174 hz.

9. The musical instrument of claim 8 wherein the musical instrument comprises a harp.

10. A music staff, the music staff consisting of a clef indicative of an atonal harmonious musical scale, and five equally spaced parallel and horizon lines separated by four spaces, the first line being the lowermost line indicating the first note with a frequency of 174 hz, the space immediately above the first line indicating the second note with a frequency of 285 hz, the second line indicating a third note with a frequency of 396 hz, the space immediately above the second line indicating a fourth note with a frequency of 417 hz, the third line indicating a fifth note with a frequency of 528 hz, the space immediately above the third line indicating the sixth note with a frequency of 639 hz, the fourth line indicating an seventh note with a frequency of 741 hz, the space immediately above the fourth line indicating an eighth note with a frequency of 852 hz and the fifth line, being the topmost line, indicating a ninth note with a frequency of 963 hz.

11. The musical instrument of claim 1, wherein the musical instrument is a keyboard, a wood wind or a horn.

* * * * *